United States Patent [19]

Pettigrew

[11] Patent Number: 4,710,549

[45] Date of Patent: Dec. 1, 1987

[54] CROSS-LINKED PHOSPHAZENE POLYMER

[75] Inventor: F. Alexander Pettigrew, Baton Rouge, La.

[73] Assignee: Ethyl Corporation, Richmond, Va.

[21] Appl. No.: 885,651

[22] Filed: Jul. 14, 1986

[51] Int. Cl.$^4$ ............................................ C08F 283/00
[52] U.S. Cl. .................................... 525/538; 528/15; 528/28; 528/31
[58] Field of Search ................... 525/538; 528/15, 28, 528/31

[56] References Cited

U.S. PATENT DOCUMENTS

| | | | |
|---|---|---|---|
| 4,026,839 | 5/1977 | Dieck et al. | 525/538 |
| 4,053,456 | 10/1977 | Dieck et al. | 525/538 |
| 4,055,520 | 10/1977 | Dieck et al. | 525/538 |
| 4,218,556 | 8/1980 | Hergenrother et al. | 528/28 |

FOREIGN PATENT DOCUMENTS 2139237A 1/1984 United Kingdom .
566853 3/1978 U.S.S.R. .

OTHER PUBLICATIONS

J. L. Speier, "Advances in Organometallic Chemistry", vol. 17, pp. 407–447 (1979).
Korshak et al., "Polymer Science USSR", vol. 23, No. 2, pp. 477–483 (1981).

*Primary Examiner*—Melvyn I. Marquis
*Attorney, Agent, or Firm*—Donald L. Johnson; John F. Sieberth; J. D. Odenweller

[57] ABSTRACT

Low molecular weight organophosphazene oligomers, especially cyclic oligomers, can be cross-linked by siloxane bridges to form solid high molecular weight polymers.

32 Claims, No Drawings

CROSS-LINKED PHOSPHAZENE POLYMER

BACKGROUND OF THE INVENTION

Low molecular weight phosphonitrilic chloride ("PNC") oligomers can be made by the reaction of ammonium chloride and phosphorus pentachloride in a solvent such as monochlorobenzene at reflux. The reaction can form both cyclic oligomers and linear oligomers. Cyclics are favored by the use of a stoichiometric excess of ammonium chloride and linears are favored by the use of a stoichiometric excess of phosphorus pentachloride. Cyclics contain in the range of 3–7 ($PNCl_2$) units. The major cyclic is trimer (up to 90% of the reaction product) followed by tetramer (up to 15% of the reaction product).

Linear PNC oligomers are oily products containing about 2–20 ($PNCl_2$) units. The most abundant linear oligomer contains about 3 to 6 ($PNCl_2$) units but can contain up to about 50 units and still be an oil.

Both cyclic and linear PNC oligomers can be converted to high molecular weight linear phosphonitrilic chloride by thermal polymerization under controlled reaction conditions. The high molecular weight PNC linears can be substituted in a reaction in which the chlorine atoms are replaced by other substituent groups such as fluoroalkoxy, phenoxy and alkylphenoxy to form polyorganophosphazenes. These organopolyphosphazenes can be used to make articles having fire resistance and low smoke emission. They can be foamed to make thermal insulation or extruded onto wire and cable as electrical insulation.

The low molecular weight PNCs are somewhat unstable and of little use in this form. They can also be substituted with groups such as phenoxy or propoxy to form organophosphazene oligomers which are useful as fire retardants. However, these substituted oligomers are fairly low molecular weight materials and cannot be used in the conventional polymer applications. Therefore a need exists for a method to cross-link the low molecular weight organophosphazene oligomers to convert them to high molecular weight polymers.

SUMMARY OF THE INVENTION

It has now been discovered that low molecular weight organophosphazene oligomers can be cross-linked by reaction with a siloxane which contains at least two Si—H groups in the presence of a platinum-containing catalyst.

DESCRIPTION OF THE PREFERRED EMBODIMENTS

A preferred embodiment of the invention is a siloxane cross-linked phosphazene polymer comprising low molecular weight organophosphazenes containing 2–50

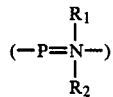

units in which $R_1$ and $R_2$ are substituent groups which can be the same or different on each unit and can be the same or different on different units, said low molecular weight organophosphazenes being crosslinked through siloxane bridging groups.

With the limitation to be explained later, the $R_1$ and $R_2$ substituents can be any nucleophile. These include alkoxy (e.g. methoxy; ethoxy; butoxy; decyloxy and the like), polyalkoxy (e.g. 2-methoxyethoxy; 2-ethoxyethoxy; 2-(2-ethoxyethoxy)ethoxy; 2-(2-methoxyethoxy)ethoxy; 2-[2-(2-methoxyethoxy)ethoxy]ethoxy; and the like), haloalkoxy (e.g. 2-chloroethoxy; trifluoromethoxy; 2,2,2-trifluoroethoxy; 2,2,3,3-tetrafluoropropoxy; 6,6,5,5,4,4,3,3,2,2-decafluorohexoxy; 4-bromobutoxy and the like), aryloxy (e.g. phenoxy, naphthoxy and the like), alkaryloxy (e.g. 4-methylphenoxy; 4-ethylphenoxy; 2,4-dimethylphenoxy; 2,6-dimethylphenoxy; 2-methyl-6-tert-butylphenoxy; 2,6-diisopropylphenoxy; 3-methylphenoxy; 4-butylphenoxy; 4-octylphenoxy and the like), alkoxyaryloxy (e.g. 4-methoxyphenoxy; 4-ethoxyphenoxy; 2-methyl-4-butoxyphenoxy; 4-methoxynaphthoxy; and the like), haloaryloxy (e.g. 4-chlorophenoxy; 4-fluorophenoxy; 2,4-dichlorophenoxy; 2,4-dibromonaphthoxy; 2,4,6-trifluorophenoxy and the like). Other types of substituents may also be present as long as they do not interfere with the course of the reaction. Likewise more than one type of group may be bonded to the substituent group. For example, both halogen and alkyl may be bonded to the same phenoxy. Likewise, both alkyl and alkenyl may be bonded to the same phenoxy. Similarly both alkoxy and alkenyl may be bonded to the same phenoxy as in 2-methoxy-4-allylphenoxy.

It is essential that at least some of the $R_1$ and $R_2$ groups prior to cross-linking contain olefinic unsaturation. Theoretically each phosphazene molecule should contain two or more olefinically unsaturated groups. Phosphazene molecules without any unsaturation do not partake in the cross-linking but are occluded in the polymer. As long as the amount of occluded phosphazene does not adversely affect the physical properties of the final product, this is acceptable. On average, the phosphazene oligomer prior to cross-linking should contain an average of at least 1.5, up to 10 or more equivalents of olefinic unsaturated groups per molecule wherein each olefinic group is one equivalent. Good results have been achieved with cyclic organophosphazenes containing an average of about 2–6 olefinic equivalents per molecule. In the case of cyclic organophosphazene trimer, this amounts to an average of about 33–100% of the substituent groups per molecule. Excellent results have been achieved wherein about 40–60 mole percent of the substituent groups are olefinically unsaturated.

With linear oligomers containing a greater number of —(P<=N)— units it is still preferred to have at least two olefinically unsaturated groups per molecule to have multiple cross-linking. However, only one olefinically unsaturated group will suffice to bond the molecule to one other molecule. On average even with oligomers containing up to 50 units there should be at least 1.5 up to 10 or more olefinically unsaturated groups per molecule. In terms of mole percent, 1.5 unsaturated groups out of the 100 substituent groups on a 50 unit oligomer would be a minimum of 1.5 mole percent. It can be seen that the amount of unsaturation in terms of mole percent varies with the average number of —(P<=N)— units per molecule so the amount of unsaturation is better expressed in terms of the average number of olefinically unsaturated groups per average molecule. This value is about 1.5–10 groups with olefinic unsaturation per average molecule.

Examples of unsaturated groups include alkenyloxy, alkenylaryloxy, alkenoylaryloxy, alkenoyloxyaryloxy and the like. Representative examples of these are allyloxy, but-3-enyloxy, but-2-enyloxy, hex-2-enyloxy, hex-5-enyloxy, 2-allylphenoxy, 3-allylphenoxy, 4-allylphenoxy, 2-allyl-4-ethylphenoxy, 2-methyl-4-allylphenoxy, 2-(but-2-enyl)phenoxy, 4-(hex-3-enyl)phenoxy, 4-propenoylphenoxy (also known as 4-acrylylphenoxy), 4-(pent-2-enoyl)phenoxy, 4-oleoylphenoxy, 4-propenoyloxyphenoxy, 2-propenoyloxyphenoxy, 4-(but-2-enoyloxy)phenoxy, 4-(hex-5-enoyloxy)phenoxy and the like.

The preferred olefinic groups are alkenylphenoxy groups especially allylphenoxy and most preferably 2-allylphenoxy.

As stated previously, the groups other than the olefinically unsaturated groups can be any of a wide range of groups as long as they do not adversely affect the properties of the cross-linked polymer. The more preferred other substituents are aryloxy and substituted aryloxy groups. Still more preferred, the other groups are phenoxy and substituted-phenoxy groups. Most preferably the other groups are phenoxy and/or alkylphenoxy, for example a mixture of phenoxy and 4-ethylphenoxy.

The initial low molecular weight polyorganophosphazenes are made from a low molecular weight PNC oligomer. These in turn are made by reacting ammonium chloride and phosphorus pentachloride in an inert solvent such as monochlorobenzene at reflux (ca. 130° C.). The product can be either a cyclic PNC oligomer or a low molecular weight linear PNC oligomer. They are usually a mixture of both cyclics and linears. Use of a stoichiometric excess of ammonium chloride favors formation of more cyclics whereas use of excess phosphorus pentachloride favors more linears. Either the linear or cyclic PNC oligomers can be used or mixtures can be used to make the substituted organo oligomers which are then cured by introduction of siloxane cross-links.

The PNC oligomer is recovered by conventional means such as by distillation. The crude PNC oligomer solution can be initially filtered and water washed prior to distillation to remove solids and unreacted water-soluble salts such as ammonium chloride.

The PNC oligomer is then dissolved in a solvent such as tetrahydrofuran, dimethoxyethane, dioxane, cyclohexane, toluene and the like and is reacted with a solution or slurry of a sodium alkoxide or aryloxide in an inert solvent of the desired substituent group. If both olefinic and non-olefinic groups are used for substitution, they can be reacted as a mixture with the PNC oligomer or they can be reacted in sequence. In a sequential operation, the sodium alkoxide or aryloxide which contains the olefinically unsaturated group is preferably reacted first. For example, if phosphazene is being prepared containing phenoxide, 4-ethylphenoxide and 2-allylphenoxide groups, an ether solution of sodium 2-allylphenoxide can be initially added to the PNC oligomer solution in an amount to supply the desired level of olefinic groups. In the case where the PNC oligomer is mainly cyclic trimer, this would be about 2-6 moles of sodium 2-allylphenoxide per mole of PNC cyclic trimer, more preferably about 2-4 moles of sodium 2-allylphenoxide per mole of cyclic trimer.

The substitution reaction will proceed readily at room temperature but the mixture can be warmed to reflux to increase the reaction rate.

Following the initial substitution, the remaining chlorine atoms can be replaced by adding an ether solution of a sodium alkoxide or aryloxide of the other desired substituent group. For example a THF solution of a mixture of sodium phenoxide and sodium 4-ethylphenoxide can be added in an amount sufficient to complete the substitution. The resultant low molecular weight polymer can be recovered by conventional means such as by precipitation and water washing and then drying. The low molecular weight polymer is usually in the form of a viscous oil.

The uncured low molecular weight organophosphazene oligomer is then cross-linked by adding a siloxane and a platinum-containing catalyst. The siloxane should contain at least 2 hydrogen atoms bonded to silicon. Siloxanes are compounds having at least one

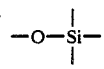

unit. They most preferably are linear siloxanes represented by the formula

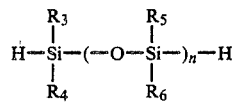

wherein n is an integer from 1 to 10 and $R_3$, $R_4$, $R_5$ and $R_6$ are hydrogens, aromatic or aliphatic hydrocarbon groups, fluoroalkyl groups or cyanoalkyl groups, more preferably aliphatic or aromatic hydrocarbon groups such as methyl, ethyl, n-propyl, isopropyl, isobutyl, n-pentyl, 2-ethyl-octyl, n-dodecyl, cyclohexyl, cyclooctyl, phenyl, 4-methylphenyl, 2-methylphenyl, naphthyl and the like. Still more preferably $R_3$, $R_4$, $R_5$ and $R_6$ are lower alkyls containing about 1-4 carbon atoms. The resultant siloxane bridging group has the structure:

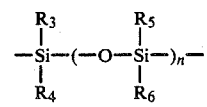

wherein n, $R_3$, $R_4$, $R_5$ and $R_6$ are the same as defined above.

Cyclic siloxanes can also be used as cross-linking agents. These contain a ring of 3 or more (—Si—O—) groups. The cyclic cross-link groups are bonded through silicon to substituted groups (i.e. $R_1$ and/or $R_2$) on the organophosphazene oligomer. The cyclic siloxane bridge should be between at least 2 different phosphazene molecules. This can be represented by the structure:

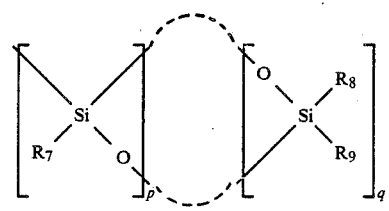

wherein p is an integer from 2 to 6, q is an integer from 0 to 6, p+q equals 3 to 8 and $R_7$, $R_8$, and $R_9$ are independently selected from hydrogen and aliphatic or aromatic hydrocarbons and the p groups and q groups can be in series or not in series and together form a cyclic siloxane. Since p is at least 2, the cyclic siloxane is bonded through silicon to at least 2 phosphazene molecules. Of course the siloxane can be bonded to more than 2 phosphazene molecules if sterically possible.

In a preferred embodiment, $R_7$ is methyl, p is an integer from 4 to 6 and q is 0.

The cyclic siloxane bridge is formed from a cyclic siloxane having the structure

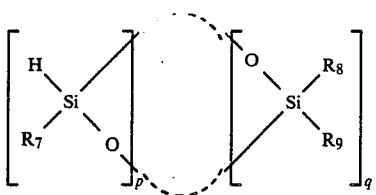

wherein p is an integer from 2 to 6, q is an integer from 0 to 6, p+q equals 3 to 8 and $R_7$, $R_8$ and $R_9$ are independently selected from hydrogen and aliphatic and aromatic hydrocarbon groups and the p groups and q groups can be in series or not in series and together form a cyclic siloxane. Since p is at least 2 there are at least 2 Si—H groups in the siloxane molecule to form the cross-link.

Another useful polysiloxane cross-linking agent includes copolymers of dialkyl, diaryl or alkylaryl siloxane with alkylhydrosiloxane, especially dimethylsiloxane/methylhydrosiloxane copolymers. These polysiloxane contain the units

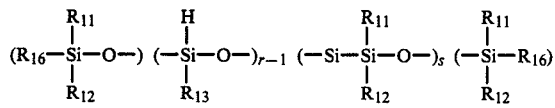

in any sequence, generally random in which r is an integer from 3 to 1000, s is an integer from 1 to 1000, and $R_{11}$, $R_{12}$, $R_{13}$ and $R_{16}$ are alkyl (e.g. $C_1$ to $C_{12}$ alkyl) or aryl (e.g. phenyl). These cross-linking copolymers contain at least two of the hydride units per molecule and the total units is in the range of about 5–1000 and the units are in any sequence.

These siloxane copolymers will make a cross-link bridge containing the units:

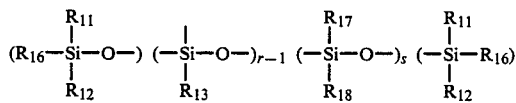

in any sequence wherein $R_{17}$ and $R_{18}$ are hydrogen, $C_{1-12}$ alkyl or aryl, $R_{11}$, $R_{12}$, $R_{13}$ and $R_{16}$ are alkyl or aryl (e.g. phenyl, tolyl), r is an integer from 3 to 1000 and s is an integer from 1 to 1000 and the units are in any sequence.

Polysiloxanes capable of forming the above cross-links are commercially available from Petrarch Systems, Bristol, PA. These include methylhydrodialkylsiloxane copolymer wherein the amount of methylhydrosiloxane units can range from 0.5 percent to 60 percent and the amount of dialkylsiloxane units can range from 40 percent up to 99.5 percent. The alkyls in the commercial siloxanes are methyl or octyl but they could be any alkyl.

The amount of siloxane cross-linking agent should be sufficient to provide the desired degree of cross-linking to give optimum physical properties. A useful range is about 0.25–2 moles of siloxane bridging compound per mole of uncured organophosphazene oligomer. A more preferred amount of siloxane is about 0.4–0.6 moles of siloxane per mole of phosphazene oligomer.

A small catalytic amount of platinum or a platinum compound is added to promote cure. A useful range is about 0.005–5 parts per each 1,000 parts by weight of phosphazene oligomer. A more useful range is about 0.1 to 1.0 parts of catalyst per 1,000 parts of oligomer. The catalyst can be finely divided platinum or a platinum compound such as a platinum halide (e.g. $PtCl_4$, $PtBr_4$ and the like), haloplatinic acids (e.g. $H_2PtCl_6$, $H_2PtBr_6$ and the like) and the hydrates of the foregoing (e.g. $PtCl_4.nH_2O$, $H_2PtCl_6.nH_2O$ and the like). Also included are the salts of the haloplatinic acids (e.g. $Na_2PtCl_4$, $NaHPtCl_4$, $Na_2PtCl_6$, $K_2PtCl_6$, $KHPtCl_4$, etc.) and the like including their hydrates.

The following examples show how the process can be conducted. All parts are by weight unless otherwise stated.

EXAMPLE 1

In a vessel was placed 2.76 parts of an organophosphazene oligomer. This oligomer was a cyclic trimer which was substituted with 45.8 mole percent orthoallylphenoxy, 30.3 mole percent phenoxy and 23.9 mole percent 4-ethylphenoxy groups. The oligomer was in the form of a viscous oil. To this was added 1.41 parts of 1,1,3,3,5,5,7,7,-octamethyltetrasiloxane and 0.9 parts of tetrahydrofuran as a co-solvent. These were mixed and then 0.1 parts of a 0.5 weight percent solution of $H_2PtCl_6.6H_2O$ in THF was added. This was thoroughly mixed and warmed to about 50° C. An exothermic reaction set in causing the temperature to rise and the THF to boil which foamed the organophosphazene oligomer. The organophosphazene oligomer cured to a rubbery foam about twice the volume of the initial components. A piece of the cured foam was placed in THF and was found to be insoluble confirming that cross-linking had occurred.

EXAMPLE 2

In a vessel was placed 3.07 parts of the phosphazene oil used in Example I. To this was added a methylhydrocyclosiloxane mixture containing 4–6

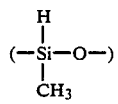

units. The liquids were immiscible so were emulsified and about 0.25 parts of the chloroplatinic acid solution in THF was added and stirred well. The emulsion was degassed under vacuum, poured into a watch glass and heated in an oven at 155° C. The liquid mixture cured forming a rubber-like polymer which was insoluble in THF.

The siloxane cross-linked organophosphazene oligomers are especially useful in applications where an initially liquid resin is required. They can be used as coatings, thermal foam insulation, potting compositions for electrical and electronic components, molding resins and the like. Other agents can be included such as reinforcing and extending fillers, pigments, blowing agents and the like.

I claim:

1. A siloxane cross-linked organophosphazene polymer comprising low molecular weight cyclic organophosphazene containing about 3–7

$$(-\underset{R_2}{\overset{R_1}{\underset{|}{P}}}=N-)$$

units in which $R_1$ and $R_2$ are substituent groups which can be the same or different on each unit and can be the same or different on different units and are selected from the group consisting of alkoxy and aryloxy and, prior to cross-linking, an average of at least 1.5 up to 10 olefinically unsaturated groups per molecule, said low molecular weight cyclic organophosphazene being cross-linked through a siloxane bridging group.

2. A polymer of claim 1 wherein said siloxane bridging group has the structure:

$$-\underset{R_4}{\overset{R_3}{\underset{|}{Si}}}-(-O-\underset{R_6}{\overset{R_5}{\underset{|}{Si}}}-)-_n$$

wherein $R_3$, $R_4$, $R_5$ and $R_6$ are the same or different aliphatic or aromatic hydrocarbon groups or hydrogen and n is an integer from 1 to 10.

3. A polymer of claim 2 wherein $R_3$, $R_4$, $R_5$ and $R_6$ are the same or different alkyl groups.

4. A polymer of claim 3 wherein said alkyl groups are methyl groups.

5. A polymer of claim 1 wherein said cyclic organophosphazene is mainly trimer.

6. A polymer of claim 5 wherein at least 33 mole percent of $R_1$ and $R_2$ substituent groups contained olefinic unsaturation prior to cross-linking.

7. A polymer of claim 6 wherein said substituent groups which contained olefinic unsaturation are selected from the group consisting of alkenyloxy and alkenylaryloxy groups.

8. A polymer of claim 7 wherein said substituent groups which contained olefinic unsaturation are selected from the group consisting of allyloxy and allylphenoxy groups.

9. A polymer of claim 6 wherein the $R_1$ and $R_2$ substituent groups other than those which contained olefinic unsaturation are selected from the group consisting of alkoxy, polyalkoxy, aryloxy, alkaryloxy, alkoxyaryloxy and haloaryloxy.

10. A polymer of claim 9 wherein said siloxane bridging groups have the structure:

$$-\underset{R_4}{\overset{R_3}{\underset{|}{Si}}}-(-O-\underset{R_6}{\overset{R_5}{\underset{|}{Si}}}-)-_n$$

wherein $R_3$, $R_4$, $R_5$ and $R_6$ are the same or different aliphatic or aromatic hydrocarbon groups or hydrogen and n is an integer from 1 to 10.

11. A polymer of claim 10 wherein said substituent groups which contained olefinic unsaturation prior to cross-linking are allylphenoxy groups.

12. A polymer of claim 11 wherein $R_3$, $R_4$, $R_5$ and $R_6$ are the same or different alkyl groups.

13. A polymer of claim 12 wherein $R_3$, $R_4$, $R_5$ and $R_6$ are methyl groups.

14. A polymer of claim 11 wherein the $R_1$ and $R_2$ substituent groups other than those which contained olefinic unsaturation are selected from the group consisting of alkoxy, phenoxy and alkylphenoxy groups.

15. A polymer comprising mainly cyclic hexaaryloxy phosphazene trimer units wherein the aryloxy groups are selected from the group consisting of phenoxy, lower alkylphenoxy and mixtures thereof, said trimer units being cross-linked to another trimer unit by a siloxane bridge having the formula:

$$-(CH_2)_3-\underset{R_4}{\overset{R_3}{\underset{|}{Si}}}-(-O-\underset{R_6}{\overset{R_5}{\underset{|}{Si}}}-)-_n(CH_2)_3- \text{ or}$$

$$-CH_2-CH-\underset{R_4}{\overset{\overset{CH_3}{|}\ \overset{R_3}{|}}{\underset{|}{Si}}}-(-O-\underset{R_6}{\overset{R_5}{\underset{|}{Si}}}-)-_n-\overset{CH_3}{\underset{|}{CH}}-CH_2- \text{ or}$$

$$-(CH_2)_3-\underset{R_4}{\overset{R_3}{\underset{|}{Si}}}-(-O-\underset{R_6}{\overset{R_5}{\underset{|}{Si}}}-)-_n\overset{CH_3}{\underset{|}{CH}}-CH_2-$$

wherein $R_3$, $R_4$, $R_5$ and $R_6$ are alkyl groups containing 1–4 carbon atoms and n is an integer from 1 to 10, said siloxane bridge being between an aromatic ring on one trimer unit and an aromatic ring on a different trimer unit.

16. A polymer of claim 15 wherein $R_3$, $R_4$, $R_5$ and $R_6$ are methyl and n averages about 3.

17. A polymer of claim 1 wherein said siloxane bridging group is a cyclic siloxane having the structure:

$$\left[\underset{R_7}{\overset{}{Si}}\underset{O}{\overset{}{\diagdown}}\underset{p}{\overset{}{\diagup}}\underset{}{\overset{O}{\diagdown}}\underset{R_9}{\overset{R_8}{Si}}\right]_q$$

wherein p is an integer from 2 to 6, q is an integer from 0 to 6, p+q equal 3 to 8 and $R_7$, $R_8$ and $R_9$ are independently selected from the group consisting of hydrogen and aliphatic and aromatic hydrocarbon groups and the p groups and q groups can be in series or not in series and together form a cyclic siloxane.

18. A polymer of claim 17 wherein $R_7$ is methyl, p is an integer from 4 to 6 and q is 0.

19. A polymer of claim 18 wherein said cyclic organophosphazene is mainly trimer.

20. A polymer of claim 19 wherein at least one-third of the $R_1$ and $R_2$ groups contained olefinic unsaturation prior to cross-linking.

21. A polymer of claim 20 wherein said groups which contained olefinic unsaturation were allylphenoxy groups.

22. A polymer of claim 21 wherein the remaining $R_1$ and $R_2$ groups other than those which contained olefinic unsaturation, if any, are selected from the group consisting of phenoxide, alkylphenoxide and mixtures thereof.

23. A polymer of claim 1 wherein said siloxane bridge contains the units:

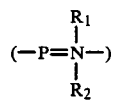

wherein the units are in any sequence and wherein $R_{11}$, $R_{12}$, $R_{13}$ and $R_{16}$ are $C_{1-12}$ alkyl or aryl, $R_{17}$ and $R_{18}$ are $C_{1-12}$ alkyl, aryl or hydrogen and r is an integer from 3 to 1000 and s is an integer in the range of 1–1000.

24. A polymer of claim 23 wherein $R_{11}$, $R_{12}$, $R_{13}$ and $R_{16}$ are methyl.

25. A process for making a siloxane cross-linked cyclic organophosphazene polymer, said process comprising:

(A) forming a mixture of (i) a low molecular weight cyclic organophosphazene oligomer containing 3–7

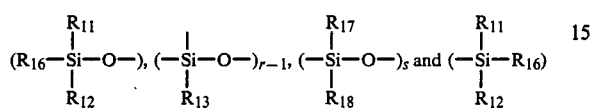

units in which $R_1$ and $R_2$ are substituents which can be the same or different on each such unit, and can be the same or different on different units and are selected from the group consisting of alkoxy and aryloxy an average of 1.5 up to 10 of the substituent groups per molecule contain olefinic unsaturation, (ii) a siloxane containing at least two Si—groups and (iii) a catalytic amount of platinum or a platinum compound and (B) heating said mixture to cause siloxane cross-linking to occur.

26. A process of claim 25 wherein said siloxane has the structure:

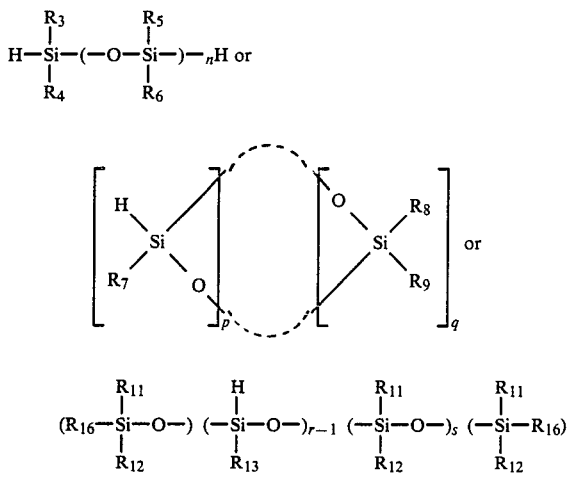

wherein $R_3$, $R_4$, $R_5$ and $R_6$ are the same or different aliphatic or aromatic hydrocarbon groups or hydrogen, n is an integer from 1 to 10, p is an integer from 2 to 6, q is an integer from 0 to 6, p+q equals 3 to 8 and $R_7$, $R_8$ and $R_9$ are independently selected from the group consisting of hydrogen and aliphatic and aromatic hydrocarbon groups and the p groups and q groups can be in series or not in series and together form a cyclic siloxane, wherein r is an integer from 3–1000, s is an integer from 1–1000; $R_{11}$, $R_{12}$ and $R_{13}$ are $C_{1-12}$ alkyl or aryl; $R_{16}$ is alkyl or aryl and the units are in any sequence.

27. A process of claim 26 wherein said substituent groups containing olefinic unsaturation are selected from the group consisting of alkenyloxy and alkenylaryloxy.

28. A process of claim 27 wherein said substituent groups containing olefinic unsaturation are allylphenoxy groups.

29. A process of claim 28 wherein the $R_1$ and $R_2$ substituents other than those containing olefinic unsaturation are selected from the group consisting of alkoxy, polyalkoxy, aryloxy, alkaryloxy, alkoxyaryloxy and haloaryloxy.

30. A process of claim 29 wherein said substituent groups other than those containing olefinic unsaturation are selected from the group consisting of phenoxy and alkylphenoxy.

31. A process of claim 30 wherein said platinum or platinum compound is selected from the group consisting of chloroplatinic acid, its salts and hydrates or mixtures thereof.

32. A process of claim 25 wherein said platinum compound is selected from the group consisting of chloroplatinic acid, its salts and hydrates or mixtures thereof.

* * * * *

UNITED STATES PATENT AND TRADEMARK OFFICE
CERTIFICATE OF CORRECTION

PATENT NO. : 4,710,549

DATED : DECEMBER 1, 1987

INVENTOR(S) : F. ALEXANDER PETTIGREW

It is certified that error appears in the above-identified patent and that said Letters Patent is hereby corrected as shown below:

Column 5 line 39, 3rd formula reads "$(-Si-Si-O)_s$" and should read -- $(-Si-O-)_s$ -- .

Column 9 line 48 reads "Si- groups" and should read -- Si-H groups -- .

Signed and Sealed this

Thirty-first Day of May, 1988

Attest:

DONALD J. QUIGG

*Attesting Officer*     *Commissioner of Patents and Trademarks*